United States Patent
Wang et al.

(10) Patent No.: US 9,257,929 B2
(45) Date of Patent: Feb. 9, 2016

(54) EXCITATION CONTROL CIRCUIT, CONTROL METHOD AND ELECTRICALLY EXCITED WIND POWER SYSTEM HAVING THE SAME

(75) Inventors: Chang-Yong Wang, Pudong Shanghai (CN); Yan-Song Lu, Pudong Shanghai (CN); Jun Chen, Pudong Shanghai (CN); Xue-Xiao Luo, Pudong Shanghai (CN); Jun-Sheng Mu, Pudong Shanghai (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 659 days.

(21) Appl. No.: 13/619,697

(22) Filed: Sep. 14, 2012

(65) Prior Publication Data
US 2013/0272038 A1   Oct. 17, 2013

(30) Foreign Application Priority Data

Apr. 16, 2012   (CN) .......................... 2012 1 0111394

(51) Int. Cl.
| | |
|---|---|
| *H02M 5/42* | (2006.01) |
| *H02P 9/10* | (2006.01) |
| *H02J 3/38* | (2006.01) |
| *H02M 7/04* | (2006.01) |
| *H02P 101/15* | (2015.01) |

(52) U.S. Cl.
CPC ................. *H02P 9/102* (2013.01); *H02J 3/386* (2013.01); *H02M 7/04* (2013.01); *H02P 2101/15* (2015.01); *Y02E 10/763* (2013.01)

(58) Field of Classification Search
CPC ........... H02P 9/10; H02P 9/102; H02P 9/105; H02P 9/107; H02J 3/386

USPC .................................... 290/8, 44, 55; 322/59
See application file for complete search history.

(56) References Cited

U.S. PATENT DOCUMENTS

| | | | |
|---|---|---|---|
| 7,622,815 B2 | 11/2009 | Rivas et al. | |
| 2002/0079706 A1* | 6/2002 | Rebsdorf et al. | 290/55 |

(Continued)

FOREIGN PATENT DOCUMENTS

| | | |
|---|---|---|
| CN | 101360628 | 2/2009 |
| CN | 101395369 | 3/2009 |

(Continued)

OTHER PUBLICATIONS

Tang, Jian-ping et al., "Wind Turbine Generator System", China Academic Journal Electronic Publishing House; http://www.cnki.net; DOI: 10.13889/j.issn.2095-3631.2010.03.008; 1671-8410 (2010) 03-0033-05; pp. 33-37 and 50.

*Primary Examiner* — Tulsidas C Patel
*Assistant Examiner* — Sean Gugger
(74) *Attorney, Agent, or Firm* — Hauptman Ham, LLP (57) ABSTRACT

The present invention provides an excitation control circuit, a control method using the same and an electrically excited wind power system having the same. The excitation control circuit comprises at least one converter and at least one AC/DC conversion module. The converter is located between an AC electric grid and a wind power generator, so as to convert AC power generated by the wind power generator into AC power corresponding to the AC electric grid. The input side of the AC/DC conversion module is electrically connected between the converter and the wind power generator, and the output side is coupled to an excitation device. The AC/DC conversion module is used to convert the AC power from the wind power generator into a DC voltage, and provides an excitation current for the wind power generator using the DC voltage.

14 Claims, 12 Drawing Sheets

(56) References Cited

U.S. PATENT DOCUMENTS

| | | | |
|---|---|---|---|
| 2004/0026929 A1* | 2/2004 | Rebsdorf et al. | 290/44 |
| 2008/0136185 A1* | 6/2008 | Edenfeld | 290/31 |
| 2009/0009129 A1* | 1/2009 | Markunas et al. | 318/702 |
| 2009/0009146 A1* | 1/2009 | Rozman et al. | 322/27 |
| 2010/0007313 A1* | 1/2010 | Jakeman et al. | 322/86 |
| 2013/0313828 A1* | 11/2013 | Moreau et al. | 290/44 |

FOREIGN PATENT DOCUMENTS

| | | |
|---|---|---|
| CN | 101459405 | 6/2009 |
| CN | 101753086 | 6/2010 |
| CN | 101888094 | 11/2010 |
| EP | 2043254 | 4/2009 |
| JP | H05-030680 | 2/1993 |
| JP | 2000-41338 | 2/2000 |
| JP | 2002-010691 | 1/2002 |
| JP | 2002-010692 | 1/2002 |
| JP | 2005-184990 | 7/2005 |
| JP | 2006-141162 | 6/2006 |
| JP | 2008-306776 | 12/2008 |
| JP | 2009-524382 | 6/2009 |
| TW | 201031817 | 9/2010 |
| WO | 99/53606 | 10/1999 |

* cited by examiner

EXCITATION CONTROL CIRCUIT, CONTROL METHOD AND ELECTRICALLY EXCITED WIND POWER SYSTEM HAVING THE SAME

RELATED APPLICATIONS

This application claims priority to Chinese Application Serial Number 201210111394.9, filed Apr. 16, 2012, which is herein incorporated by reference.

BACKGROUND

1. Field of Invention

The present invention relates to the field of wind power generation technology. More particularly, the present invention relates to an excitation control circuit, a control method and an electrically excited wind power system including the same.

2. Description of Related Art

With the ever-increasing seriousness of energy-related problems in recent times, much attention has been given to power generation realized through renewable energy, such as wind power generation and solar electrical energy generation. Taking wind power generation as an example, from a stall-regulated wind power system to a variable-speed-and-constant-frequency (VSCF) wind power system, and from a wind power system with a gear case to a direct-drive wind power system without a gear case, the installed capacity of wind power generation in Taiwan and other countries is developing rapidly. Specifically, with the continuous increase in the unit capacity of a current wind power generator, VSCF technology is gradually playing a dominate role. In a current megawatt wind power generator, the gearbox is a component with a relatively high fault rate, so that much attention has been given to the development of the direct-drive wind power system without a gearbox. This is also the case due to such a system's advantages of low noise, long turbine operation time and low operation maintenance costs.

There are two main types of direct-drive wind power systems, namely, the permanent magnet-type system and the electrical excitation-type system. However, with the high cost of rare earth materials, the manufacturing costs associated with a permanent magnet-type wind power system are high. As a result, research and development is increasingly being focused on the electrically excited wind power system.

In the prior art electrically excited wind power system, the input voltage of a DC-DC converter is provided by a DC (direct current) bus of a single set of back-to-back converters (formed by a generator-side converter and a grid-side converter), and an appropriate DC voltage is outputted after being bucked by the DC-DC converter for use as supply the excitation device. However, when the DC-DC converter malfunctions, the wind power generator is suddenly de-excited, causing the disappearance of torque, and therefore the converter cannot provide a brake torque to the wind power generator, resulting in damage to the components in the wind power generation system. In another structure of an electrically excited wind power system, by using the AC (alternating current) voltage of the electric grid, a main excitation switch, a power frequency transformer and a controlled rectifier bridge are sequentially arranged to output a rectified DC voltage. Thus an excitation winding is directly provided, or the rectified DC voltage is provided to a DC-DC converter and then an appropriate DC voltage is outputted after being bucked by the DC-DC converter for use as supply to the excitation device. However, the size of the power frequency transformer is large and the cost thereof is high. More seriously, when the voltage of the electric grid drops or when a power failure of the electric grid occurs, the DC input voltage of the DC-DC converter disappears, and the wind power generator is suddenly de-excited, causing a sudden change in torque.

When the wind power generator is suddenly de-excited, causing a disappearance of the torque in the electrically excited wind power system of the prior art, this significantly reduces the reliability of electrical excitation and the operation stability of the system. In view of this, many in the industry are endeavoring to find ways in which to design a reliable excitation control circuit, so as to improve the operation stability of the excitation device and ensure that the magnetic field does not disappear suddenly.

SUMMARY

In order to solve the above disadvantages of the electrically excited wind power system of the prior art, the present invention provides an excitation control circuit, a control method and an electrically excited wind power system including the same.

According to an embodiment of the present invention, an excitation control circuit for an electrically excited wind power system is provided. The excitation control circuit includes at least one converter and at least one AC/DC conversion module. The at least one converter is arranged between an AC electric grid and a wind power generator, so as to convert AC power generated by the wind power generator into AC power corresponding to the AC electric grid. The at least one AC/DC conversion module has an input side and an output side. The input side of the at least one AC/DC conversion module is electrically connected between the converter and the wind power generator. The output side of the at least one AC/DC conversion module is coupled to an excitation device. The AC/DC conversion module is used to convert the AC power from the wind power generator into a DC voltage, and provides an excitation current for the wind power generator using the DC voltage.

In an embodiment, the converter includes a generator-side converter and a grid-side converter. The generator-side converter is used to rectify the AC power from the wind power generator into a DC power. The grid-side converter is used to invert the DC power into the AC power corresponding to the AC electric grid. The grid-side converter is electrically connected to the generator-side converter using a DC bus capacitor.

In an embodiment, the AC/DC conversion module includes a rectifier circuit and a DC/DC converter. The DC/DC converter is used to perform DC/DC conversion of the rectifier voltage outputted by the rectifier circuit.

In an embodiment, the converter and the wind power generator are electrically connected to the rectifier circuit using a first filter unit, so as to filter the AC power generated by the wind power generator. Furthermore, a first buffer unit is further arranged between the rectifier circuit and the DC/DC converter. The first buffer unit is formed by a buffer resistance and a switch connected in parallel with each other.

In another embodiment, the rectifier circuit is electrically connected to the DC/DC converter using a second filter unit, so as to filter the rectifier output voltage. Furthermore, a second buffer unit is further arranged between the rectifier circuit and the DC/DC converter. The second buffer unit is formed by a buffer resistance and a switch connected in parallel with each other.

In an embodiment, the excitation control circuit further includes a DC/DC conversion module. The DC/DC conversion module boosts or bucks the DC voltage outputted by the AC/DC conversion module, so as to obtain an excitation voltage corresponding to the excitation current.

In an embodiment, the at least one converter includes first and second converters. The at least one AC/DC conversion module includes first and second AC/DC conversion modules. The first converter is electrically connected to the first AC/DC conversion module. The second converter is electrically connected to the second AC/DC conversion module. The first and second AC/DC conversion modules are complementary with each other.

Furthermore, a first common-mode rejection unit is further arranged between the converter and the AC electric grid so as to reject a common-mode current.

Furthermore, a second common-mode rejection unit is further arranged between the converter and the wind power generator, so as to reject a common-mode current.

Moreover, a dv/dt rejection unit is further arranged between the converter and the wind power generator, so as to reject a dv/dt voltage.

According to another embodiment of the present invention, an electrically excitation method using the excitation control circuit mentioned above is provided. In this method, the wind power generator is activated by using the AC power from the AC electric grid. After the wind power generator is activated, the operation mode of the converter is switched into a control mode.

In an embodiment, the step of activating the wind power generator includes: i) the converter converting the AC power of the AC electric grid into the AC power of the wind power generator according to predetermined voltage information; ii) the AC/DC conversion module converting the AC power of the wind power generator into a first DC power, and providing the excitation current of the wind power generator using the first DC power; and iii) the excitation device starting to operate, so as to activate the wind power generator and thus transfer energy power to the AC electric grid. The converter includes a generator-side converter and a grid-side converter, and the step i) includes: the grid-side converter converting the AC power of the AC electric grid into a second DC power; and the generator-side converter converting the second DC power into the AC power of the wind power generator.

In an embodiment, the control mode is a torque control mode or a blade-speed control mode.

According to a further embodiment of the present invention, an electrically excited wind power system is provided. The electrically excited wind power system includes a wind power generator and an excitation device. The excitation device is used to provide an excitation current of the wind power generator. The electrically excited wind power system further includes the excitation control circuit mentioned above.

By adopting the present invention, one terminal of the excitation control circuit is coupled between the converter and the wind power generator, and the other terminal is coupled to the excitation device. Thus the excitation power directly enters the excitation device from the wind power generator, without consuming the power by passing through the converter. As a result, the capacity load of the converter is reduced while the excitation efficiency of the system is improved. Furthermore, even when the voltage of the AC electric grid drops or a power failure of the AC electric grid occurs, the excitation control circuit can still output a DC voltage through the AC/DC conversion module, so as to provide the DC voltage to the excitation device of the wind power generator. Moreover, when the excitation control circuit has two circuit structures each formed by the converter and the AC/DC conversion module, the converters of the two circuit structures are complementary with each other, or alternatively, the AC/DC conversion modules of the two circuit structures are complementary with each other.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

In order to make the technical contents of the present invention more detailed and more comprehensive, various embodiments of the present invention are described below with reference to the accompanying drawings. Wherever possible, the same reference numbers are used in the drawings and the description to refer to the same or like parts. However, those of ordinary skill in the art should understand that the embodiments described below are not used for limiting the scope of the present invention. Moreover, the accompanying drawings are only illustrative and are not made according to actual size.

Figure 1:
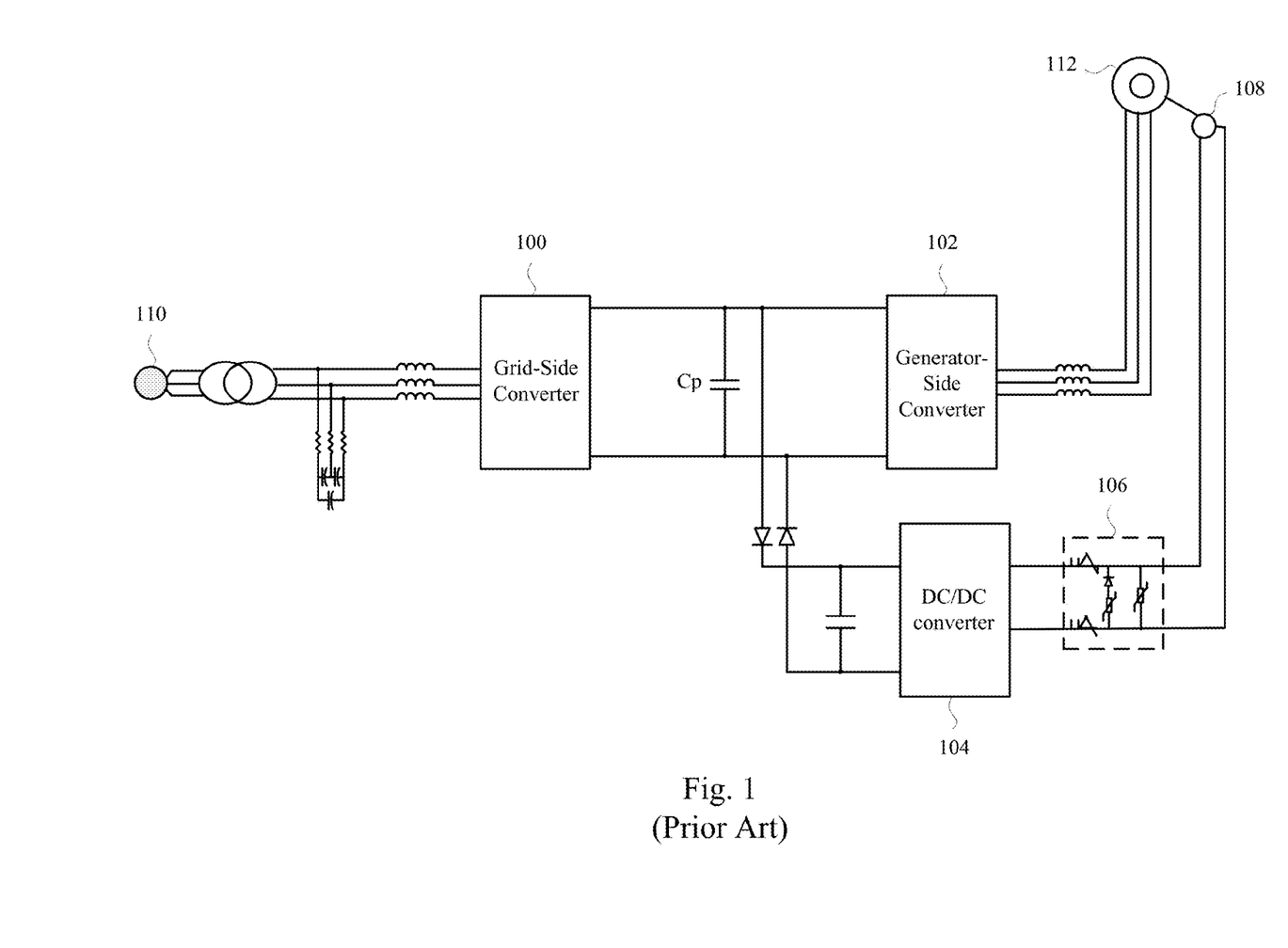
FIG. 1 illustrates a circuit diagram of an excitation control circuit included in an electrically excited wind power system of the prior art.

FIG. 1 illustrates a circuit diagram of an excitation control circuit of an electrically excited wind power system of the prior art. Referring to FIG. 1, the excitation control circuit includes a power converter, a DC/DC converter 104, a de-excitation device 106 and an excitation device 108. The power converter includes a grid-side converter 100, a generator-side converter 102, and a bus capacitor Cp arranged between the grid-side converter 100 and the generator-side converter 102.

The AC side of the grid-side converter 100 is coupled with an electric grid 110, and the AC side of the generator-side converter 102 is coupled with a three-phase winding of a wind power generator 112. Furthermore, the DC-DC converter 104 is electrically connected to the bus capacitor Cp by a pair of backward diodes, so as to use a DC voltage loaded on two terminals of the bus capacitor Cp as a DC input voltage of the DC-DC converter 104. The DC/DC converter 104 bucks the inputted DC voltage, and then the DC voltage outputted by the DC/DC converter 104 is used for supplying power to the excitation device 108. When the excitation device 108 operates normally, an excitation current is outputted to the wind power generator 112. The de-excitation device 106 is arranged between the DC/DC converter 104 and the excitation device 108. When the excitation device 108 operates abnormally or the excitation current suddenly disappears, the de-excitation device 106 quickly cancels the established excitation field.

It can be seen from FIG. 1 that the power converter accepts the entire power outputted by the wind power generator 112, and the DC power required for operation of the excitation device 108 comes from an output terminal of the DC/DC converter 104. Once an operation fault occurs in the power converter or the DC/DC converter 104, the excitation device 108 suddenly shuts off. Thus the wind power generator 112 is suddenly de-excited, causing the disappearance of the torque, and therefore the converter cannot provide a brake torque to the wind power generator 112, resulting in damage to the components of the wind power generation system. In view of this, such a design of the circuit structure results in serious problems with respect to excitation reliability and operation stability of the electrically excited wind power system.

Figure 2:
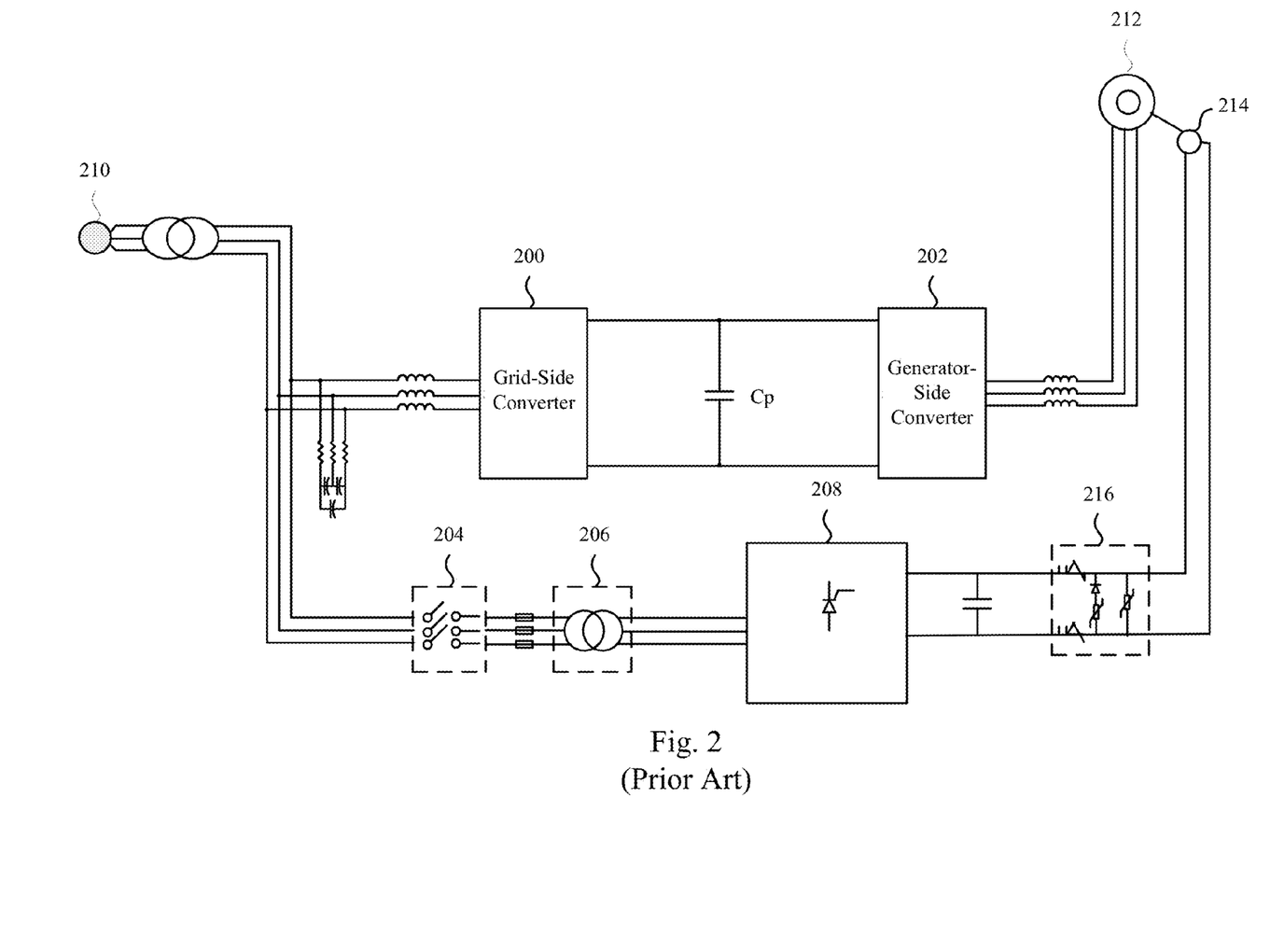
FIG. 2 illustrates a circuit diagram of another excitation control circuit included in an electrically excited wind power system of the prior art.

FIG. 2 illustrates a circuit diagram of another excitation control circuit of an electrically excited wind power system of the prior art. Referring to FIG. 2, the excitation control circuit includes a power converter, a main excitation switch 204, a power frequency transformer 206, a phase-controlled rectifier bridge 208, a de-excitation device 216 and an excitation device 214. Similar to the conventional configuration described with reference to FIG. 1, the power converter includes a grid-side converter 200, a generator-side converter 202, and a bus capacitor Cp arranged between the grid-side converter 200 and the generator-side converter 202.

The AC side of the grid-side converter 200 is coupled with an electric grid 210, and the AC side of the generator-side converter 202 is coupled with a three-phase winding of a wind power generator 212. Different from the configuration shown in FIG. 1, in FIG. 2 the power supply of the excitation device 214 is not realized by the bus capacitor and the DC/DC converter of the power converter, and instead a power supply voltage is provided directly by the AC electric grid 210, the power frequency transformer 206 and a phase-controlled rectifier bridge 208. However, this type of excitation still has various disadvantages. For example, the DC power supply voltage of the excitation device 214 comes from the AC electric grid 210, such that when the voltage of the AC electric grid 210 drops or a total power failure of the AC electric grid 210 occurs, the DC voltage at the output terminal of the phase-controlled rectifier bridge 208 suddenly disappears and the excitation device 214 shuts off. Thus the wind power generator 212 is de-excited, causing a sudden change in torque. Moreover, the power frequency transformer 206 arranged following the excitation switch 204 and a fuse is large and high in cost, which increases the overall cost of the excitation control circuit as well as the amount of space used for arranging and installing the circuit.

Figure 3:
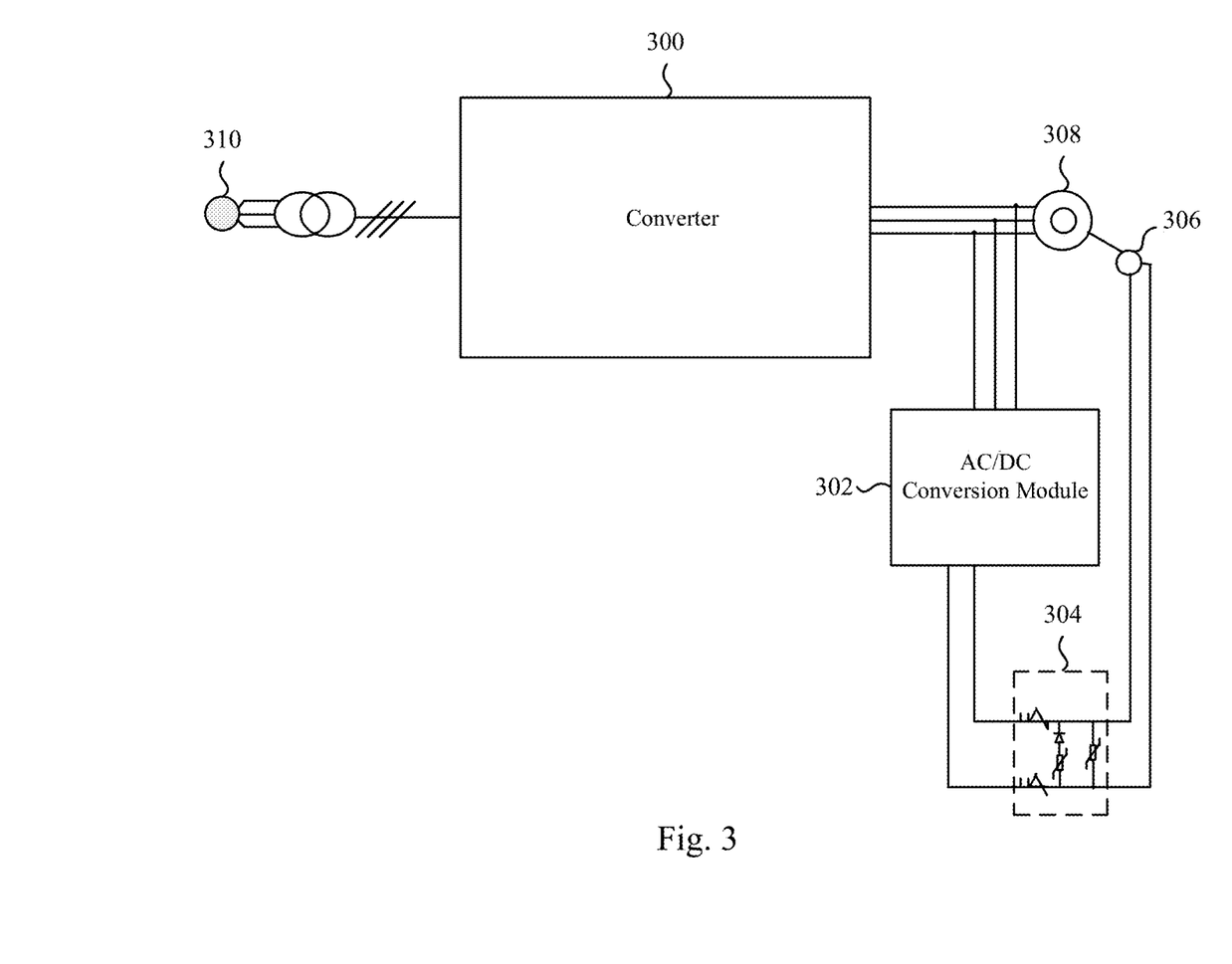
FIG. 3 illustrates a circuit diagram of an excitation control circuit used in an electrically excited wind power system according to an aspect of the present invention.

FIG. 3 illustrates a circuit diagram of an excitation control circuit for an electrically excited wind power system of the present invention. The excitation control circuit of the present invention solves the problems associated with the conventional excitation control circuits shown in FIGS. 1 and 2. Referring to FIG. 3, the excitation control circuit includes a converter 300 and an AC/DC conversion module 302. Moreover, the excitation control circuit further includes a de-excitation device 304 arranged between the output terminal of the AC/DC conversion module 302 and an excitation device 306, such that when the excitation device 306 operates abnormally or the excitation current suddenly disappears, the established excitation field can be quickly canceled.

The converter 300 is arranged between an AC electric grid 310 and a wind power generator 308, so as to convert AC power generated by the wind power generator 308 into AC power corresponding to the AC electric grid 310. In a specific embodiment, the converter 300 receives and converts the AC power generated by the wind power generator 308 into a DC power, and then the DC power is inverted so as to output AC power corresponding to the AC electric grid 310. For example, the outputted AC power has the same amplitude, frequency and phase with the voltage of the AC electric grid. The AC/DC conversion module 302 has an input side and an output side.

The input side is electrically connected between the converter 300 and the wind power generator 308. The output side is coupled to the excitation device 306, so as to convert the AC power generated by the wind power generator 308 into a DC voltage and thus provide the excitation current of the excitation device 306 using the DC voltage.

Figure 4:
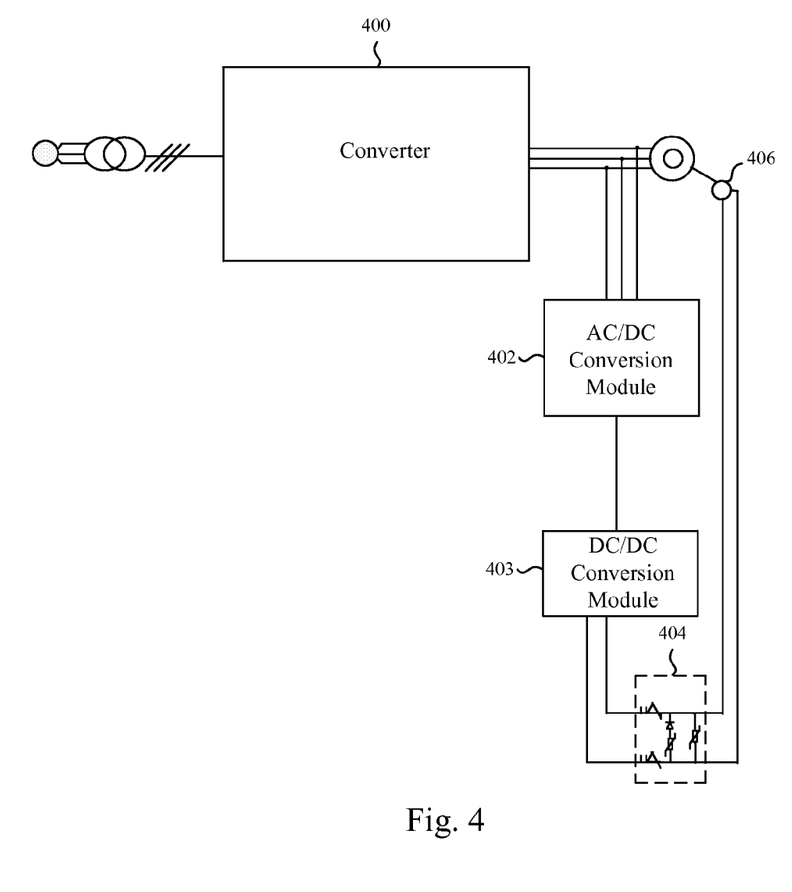
FIG. 4 illustrates a circuit diagram of a specific embodiment of the excitation control circuit of the present invention.

FIG. 4 illustrates a circuit diagram of a specific embodiment of the excitation control circuit of the present invention. As shown in FIG. 4, the excitation control circuit includes a converter 400, an AC/DC conversion module 402 and a DC/DC conversion module 403. Moreover, the excitation control circuit further includes a de-excitation device 404 arranged between the output terminal of the DC/DC conversion module 403 and the excitation device 406, such that when the excitation device 406 operates abnormally or the excitation current suddenly disappears, the established excitation field can be quickly canceled.

The DC/DC conversion module 403 is used to boost or buck a DC voltage outputted by the AC/DC conversion module 402, so as to obtain an excitation voltage corresponding to the excitation current of the excitation device 406. For example, when the DC voltage is higher than a predetermined excitation voltage, the DC/DC conversion module 403 operates as a buck DC/DC converter, so as to buck the DC voltage. Thus the bucked DC voltage is equal to the predetermined excitation voltage. Also for example, when the DC voltage is lower than a predetermined excitation voltage, the DC/DC conversion module 403 operates as a boost DC/DC converter, so as to boost the DC voltage. Thus the boosted DC voltage is equal to the predetermined excitation voltage.

Figure 5:
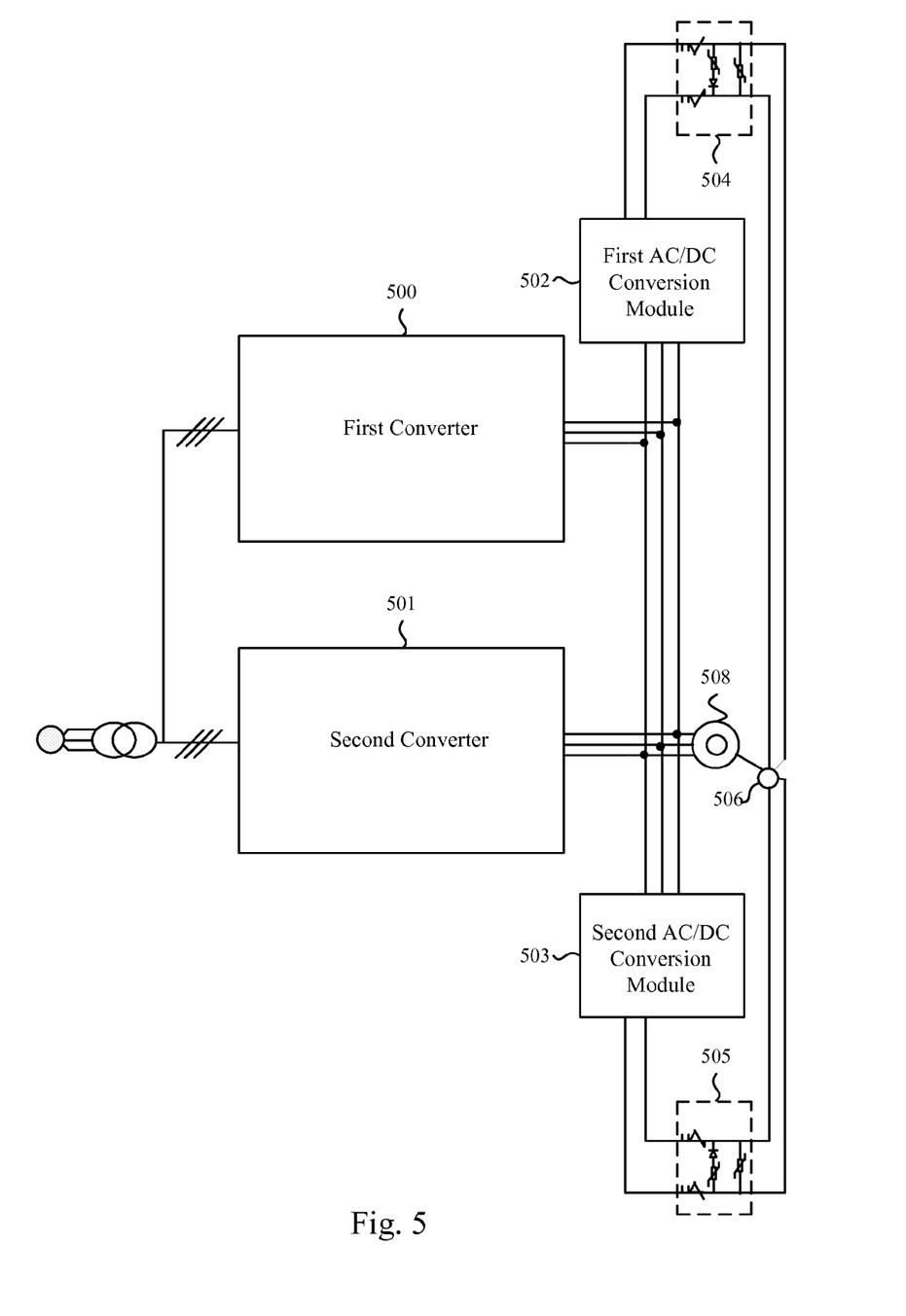
FIG. 5 illustrates a circuit diagram of another specific embodiment of the excitation control circuit of the present invention.

FIG. 5 illustrates a schematic circuit structure diagram of a specific embodiment of the excitation control circuit of the present invention. As shown in FIG. 5, the excitation control circuit includes a first converter 500 and a second converter 501, a first AC/DC conversion module 502 and a second AC/DC conversion module 503. The first converter 500 is electrically connected to the first AC/DC conversion module 502. The second converter 501 is electrically connected to the second AC/DC conversion module 503. The first and second AC/DC conversion modules 502 and 503 are connected to the excitation device 506 of the wind power generator through the corresponding de-excitation devices 504 and 505. Through such a configuration, when a fault or an abnormal condition is encountered with the first converter 500 or the first AC/DC conversion module 502, the excitation current of the excitation device 506 is provided by the excitation control circuit formed by the second converter 501 and the second AC/DC conversion module 503.

Alternatively, when a fault or an abnormal condition is encountered with the second converter 501 or the second AC/DC conversion module 503, the excitation current of the excitation device 506 is provided by the excitation control circuit formed by the first converter 500 and the first AC/DC conversion module 502. It can be seen from the above that an excitation control circuit formed by the first converter 500 and the first AC/DC conversion module 502 connected in series and another excitation control circuit formed by the second converter 501 and the second AC/DC conversion module 503 connected in series are complementary with each other. A higher excitation reliability of the electrically excited wind power system and operation stability of the wind power generator 508 can be realized with such a complementary mechanism.

Figure 6:
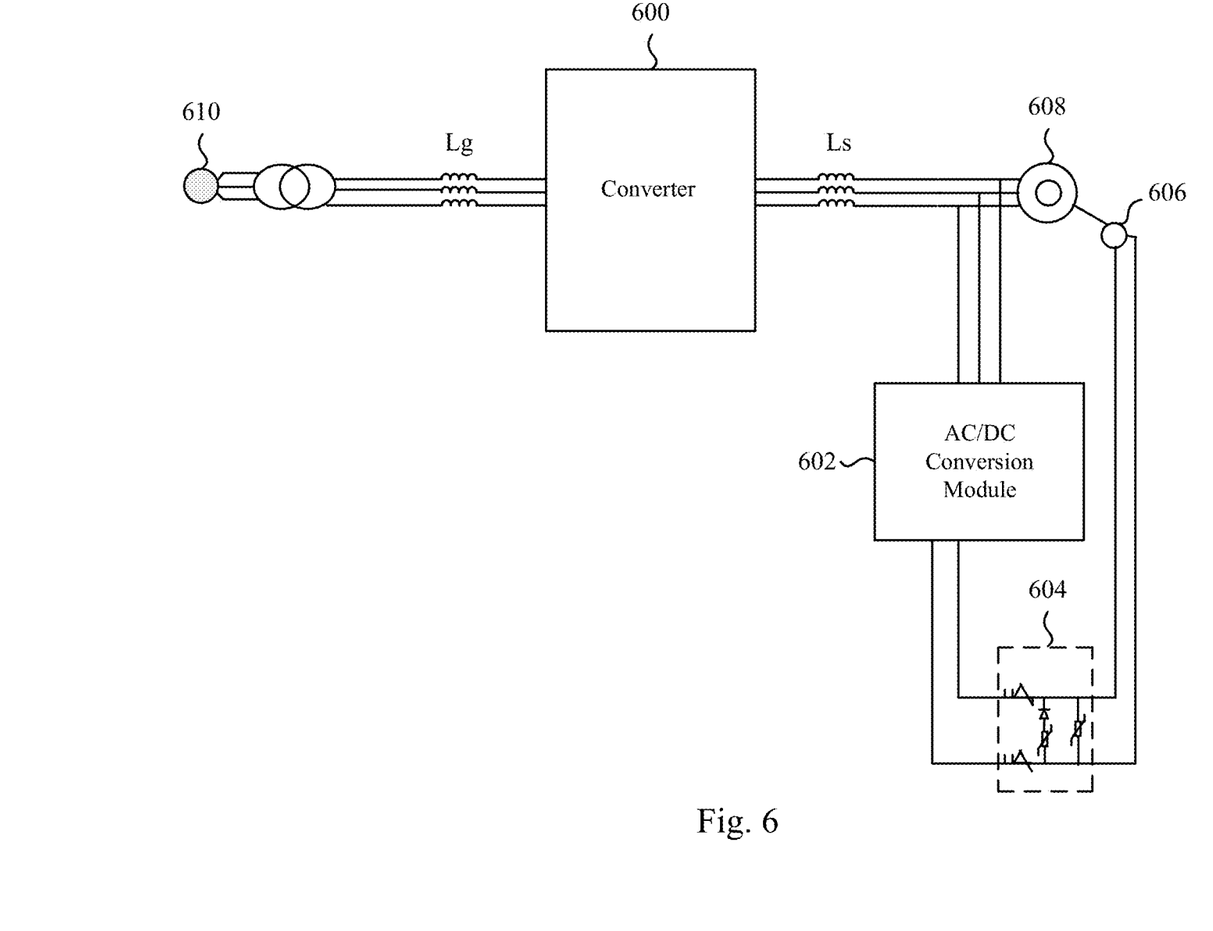
FIG. 6 illustrates a circuit diagram of another specific embodiment of the excitation control circuit of the present invention.

FIG. 6 illustrates a circuit diagram of another specific embodiment of the excitation control circuit of the present invention. Referring to FIG. 6, the excitation control circuit includes a converter 600 and an AC/DC conversion module 602. Moreover, the excitation control circuit further includes a de-excitation device 604 arranged between the output terminal of the AC/DC conversion module 602 and the excitation device 606, such that when the excitation device 606 operates abnormally or the excitation current suddenly disappears, the established excitation field can be quickly canceled.

A common-mode rejection unit Lg is further arranged between the converter 600 and an AC electric grid 610, so as to reject a common-mode current of the excitation control circuit. Alternatively, another common-mode rejection unit Ls is further arranged between the converter 600 and a wind power generator 608, so as to reject the common-mode current. Furthermore, in order to prevent a situation in which the voltage of the converter 600 adjacent to the side of the wind power generator 608 suddenly changes, a dv/dt rejection unit (not shown) is further arranged between the converter 600 and the wind power generator 608, so as to reject the dv/dt voltage. The dv/dt rejection unit for example is an inductor.

Figure 7:
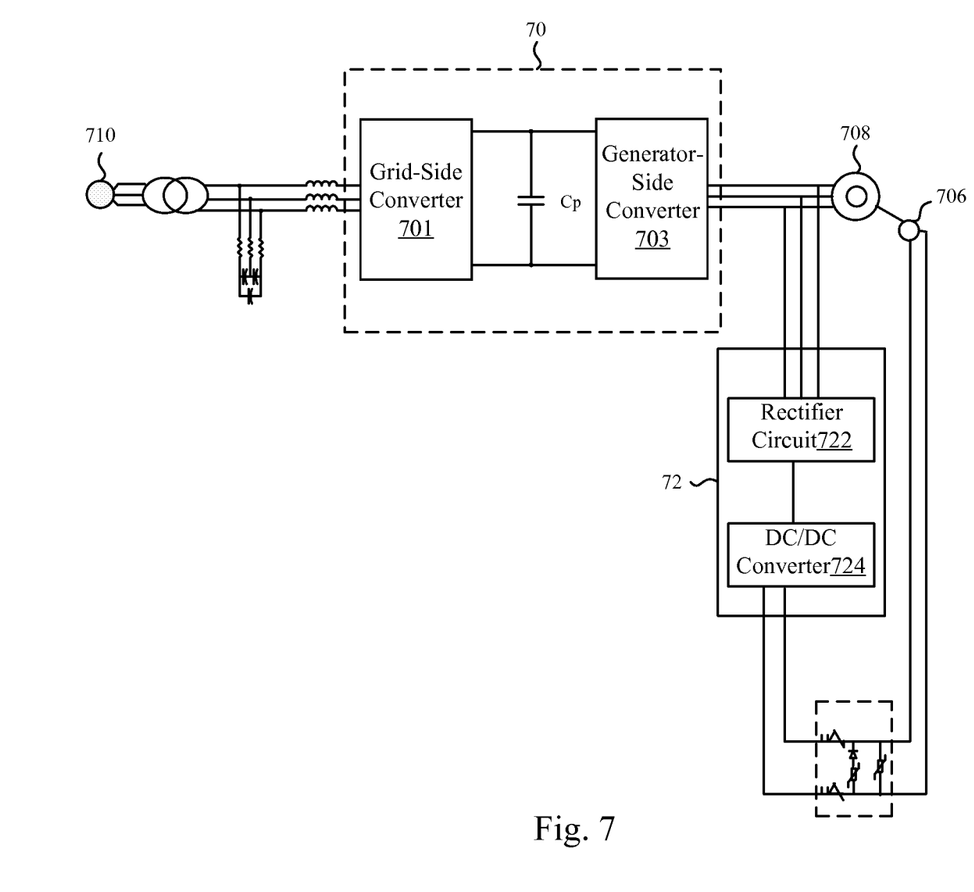
FIG. 7 illustrates a circuit diagram of a further specific embodiment of the excitation control circuit of the present invention.

FIG. 7 illustrates a circuit diagram of a further specific embodiment of the excitation control circuit of the present invention. Referring to FIG. 7, a converter 70 includes a grid-side converter 701 and a generator-side converter 703. The grid-side converter 701 has an AC side and a DC side. The AC side of the grid-side converter 701 is electrically connected to an AC electric grid 710, so as to invert DC power from the DC side of the grid-side converter 701 into an AC power corresponding to the voltage of the AC electric grid 710. The generator-side converter 703 also has an AC side and a DC side. The AC side of the generator-side converter 703 is electrically connected to a wind power generator 708, so as to rectify an AC voltage generated by the wind power generator 708 into a DC voltage. The DC side of the grid-side converter 701 is electrically connected to the DC side of the generator-side converter 703 through a DC bus capacitor Cp, so as to form an AC-DC-AC-type full power converter.

It should be understood by those of ordinary skill in the art that the full power converter mentioned above is only an exemplary embodiment, and other existing or future converter structures may also be applicable to the present invention, and such converter structures fall within the scope of the present invention, and are incorporated herein by reference.

In a specific embodiment, an AC/DC conversion module 72 of the excitation control circuit includes a rectifier circuit 722 and a DC/DC converter 724. The rectifier circuit 722 is connected to an output side of the DC/DC converter 724, so as to enable DC/DC conversion of the rectifier voltage outputted by the rectifier circuit 722. The rectifier circuit 722 for example is a three-phase controlled rectifier bridge or a single-phase controlled rectifier bridge. Particularly, the rectifier circuit 722 rectifies an AC power generated by the wind power generator 708 into a DC power, and the DC/DC converter 724 converts the DC power into the excitation current of the excitation device 706. However, the present invention is not limited in this regard. The AC/DC conversion module 72 for example may only include a rectifier circuit so as to rectify the AC power generated by the wind power generator 708 into a DC power in a manner corresponding to the excitation current of the excitation device 706.

Figure 8:
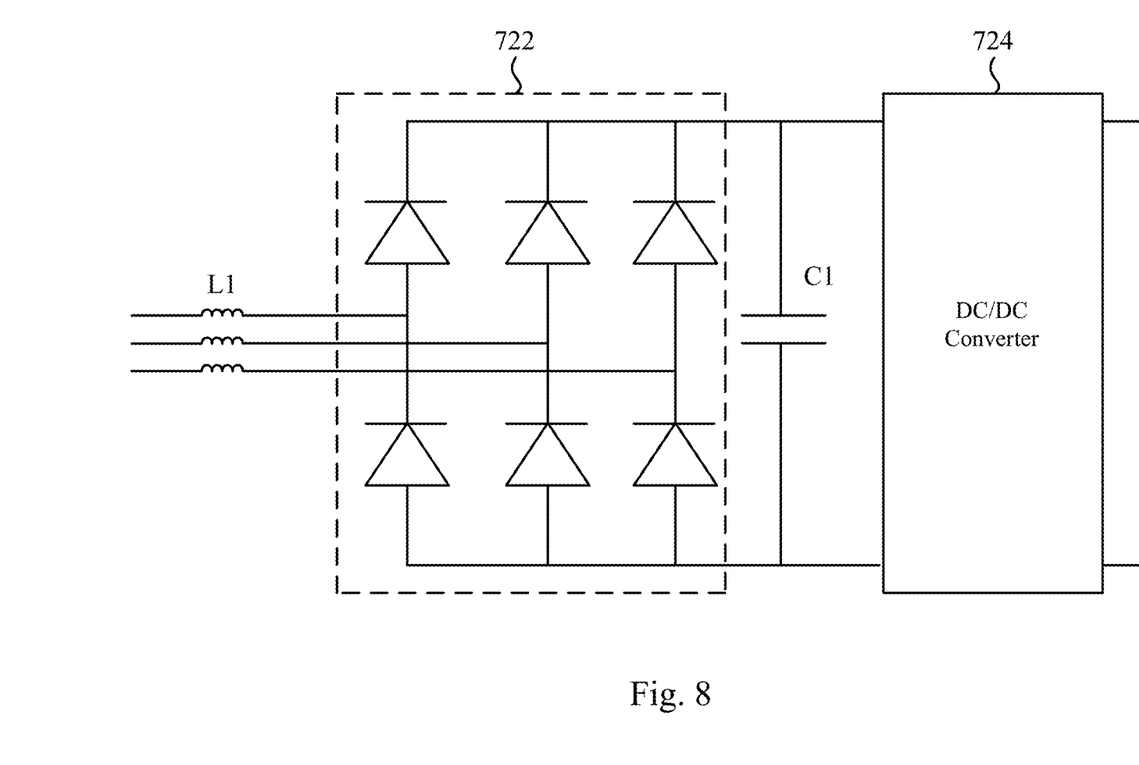
FIG. 8 illustrates a circuit diagram of an embodiment of a rectifier circuit and a DC/DC converter included in the excitation control circuit of FIG. 7.
Figure 9:
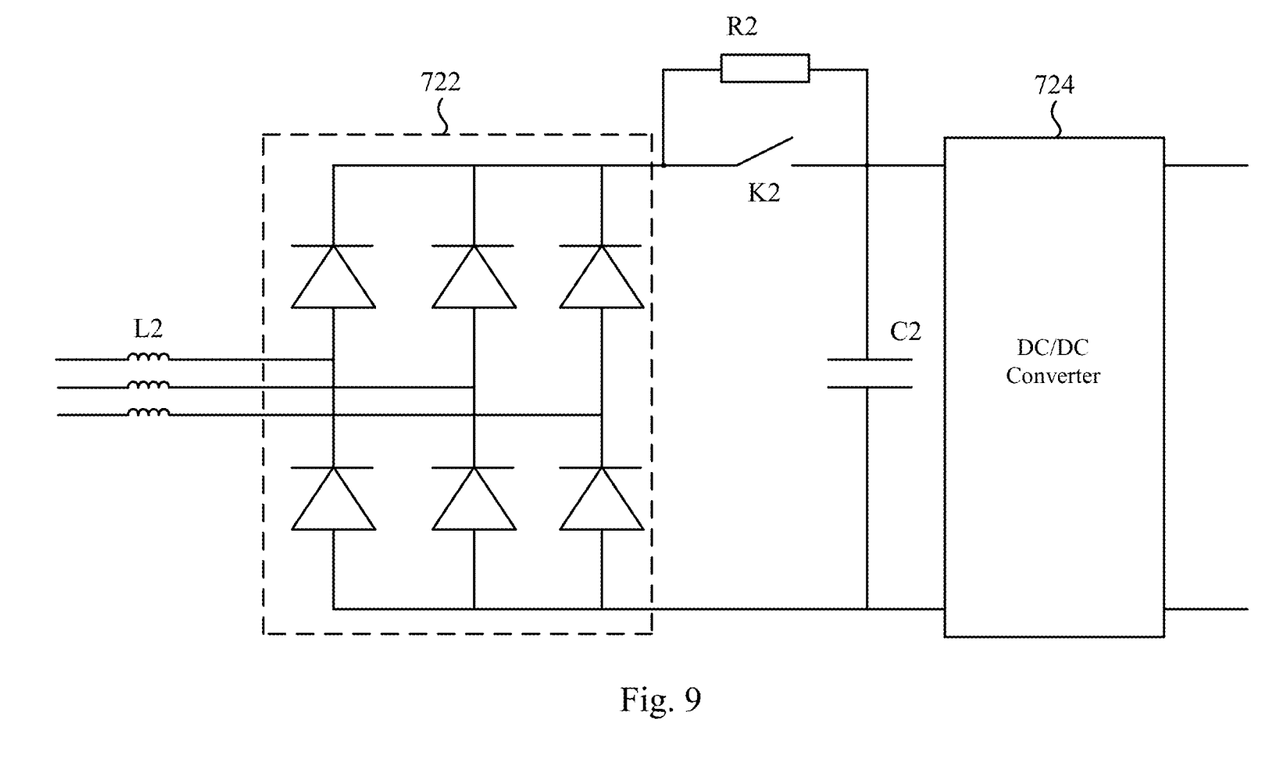
FIG. 9 illustrates a circuit diagram of another embodiment of the rectifier circuit and the DC/DC converter included in the excitation control circuit of FIG. 7.
Figure 10:
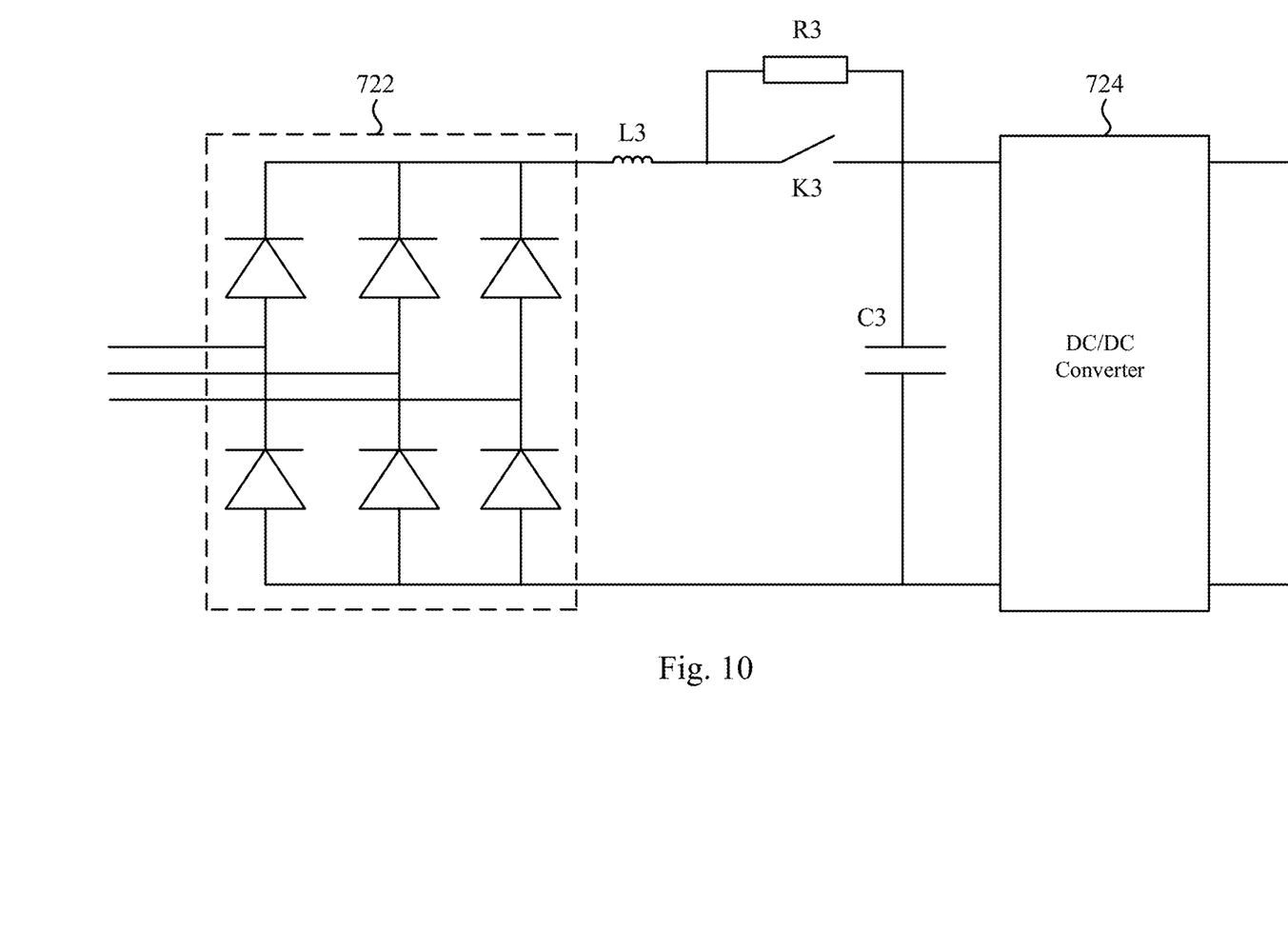
FIG. 10 illustrates a circuit diagram of a further embodiment of the rectifier circuit and the DC/DC converter included in the excitation control circuit of FIG. 7.

FIGS. 8-10 illustrate multiple embodiments of the circuit structure of the rectifier circuit and the DC/DC converter included in the excitation control circuit of FIG. 7.

As shown in FIG. 8, the converter 70 and the wind power generator 708 are electrically connected to the rectifier circuit 722 through a filter unit, so as to filter the AC power generated by the wind power generator 708. The filter unit for example is an inductor L1.

As shown in FIG. 9, a buffer unit is further arranged between the rectifier circuit 722 and the DC/DC converter 724. The buffer unit is formed by a buffer resistance R2 and a switch K2 connected in parallel with each other. Similar to FIG. 8, in the excitation control circuit the converter 70 is also connected to the rectifier circuit 722 through a filter unit. The filter unit for example is an inductor L2.

As shown in FIG. 10, the rectifier circuit 722 is electrically connected to the DC/DC converter 724 through a filter unit, so as to filter the rectifier output voltage. In an embodiment, a buffer unit is further arranged between the rectifier circuit 722 and the DC/DC converter 724. The buffer unit is formed by a buffer resistance R3 and a switch K3 connected in parallel with each other, and the buffer unit is connected in series to the filter unit. The filter unit for example is an inductor L3.

Furthermore in each of FIGS. 8-10, a filter capacitor (i.e., the capacitors C1, C2 and C3) is arranged between the rectifier circuit 722 and the DC/DC converter 724, so as to further filter the rectifier output voltage.

Figure 11:
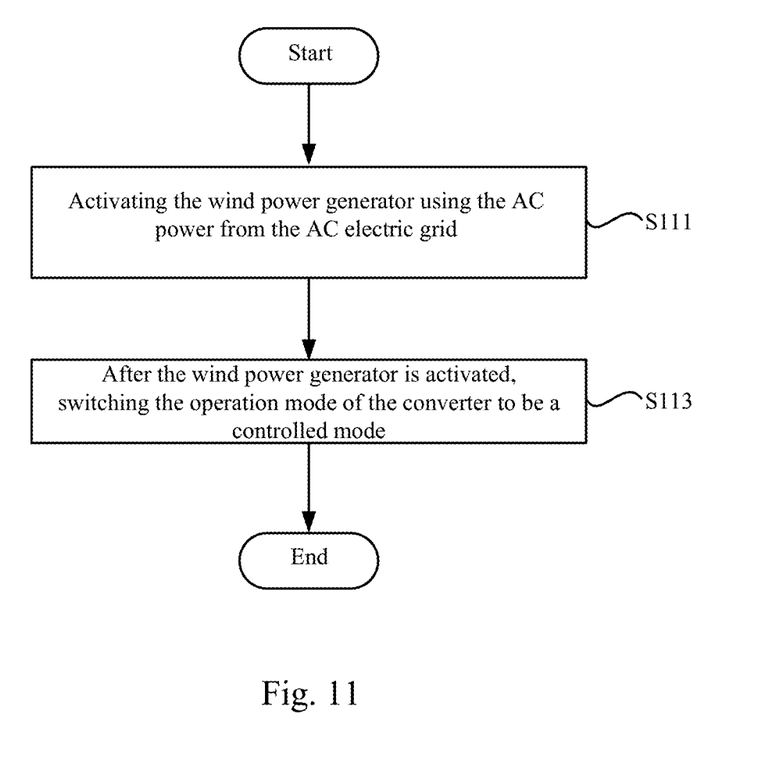
FIG. 11 illustrates a flow chart of an electrically excitation method using the excitation control circuit of FIG. 3 according to an aspect of the present invention.

FIG. 11 illustrates a flow chart of an electrically excitation method using the excitation control circuit of FIG. 3. Referring to FIG. 11, first, in step S111, the wind power generator 308 is activated by using the AC power of the AC electric grid 310. Subsequently in step S113, after the wind power generator 308 is activated, the operation mode of the converter 300 is switched into a control mode. The control mode includes a torque control mode or a blade-speed control mode. The torque control mode refers to a mode in which the converter 300 receives a torque instruction from a controller and torque controls the wind power generator 308 according to this instruction, so as to control the torque to be the torque value required by the controller. The blade-speed control mode refers to a mode in which the converter 300 receives a blade-speed instruction from the controller and controls the blade speed of the wind power generator 308 according to the instruction, so as to control the blade speed to be the blade speed value required by the controller.

Figure 12:
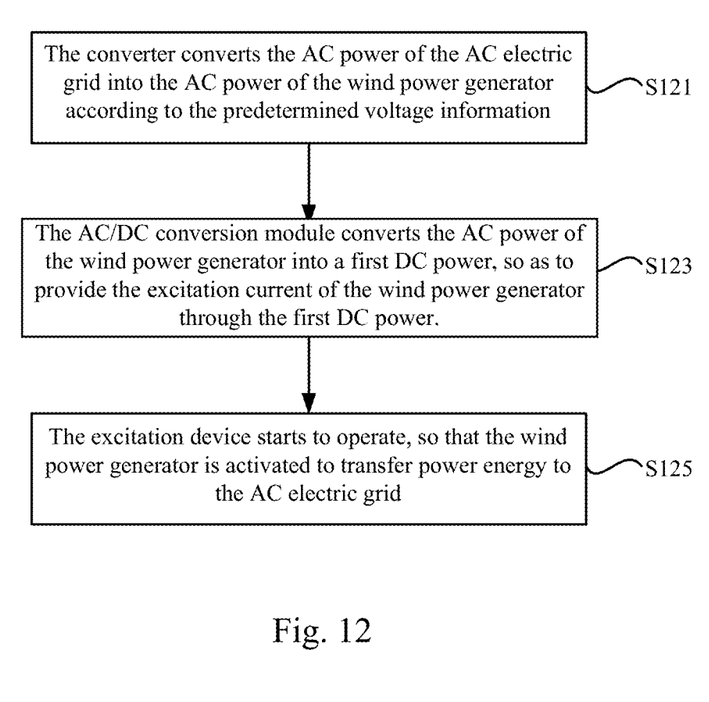
FIG. 12 illustrates a flow chart of an embodiment of activating a wind power generator by the electrically excitation method of FIG. 11.

In an embodiment, referring to FIG. 12 the step S111 of activating the wind power generator can also be realized by sequentially performing the following steps. Step S121 is first performed, where the converter 300 converts the AC power of the AC electric grid 310 into the AC power of the wind power generator 308 according to predetermined voltage information (such as the frequency, the amplitude and the phase). Subsequently step S123 is performed, where the AC/DC conversion module 302 converts the AC power of the wind power generator into a first DC power, so as to provide the excitation current of the wind power generator 308 through the first DC power. Afterwards step S125 is performed, where the excitation device 306 starts to operate, so that the wind power generator 308 is activated to transfer power energy to the AC electric grid 310.

In an embodiment, the converter 300 includes a grid-side converter and a generator-side converter. More particularly, the grid-side converter has an AC side and a DC side, and the AC side of the grid-side converter is electrically connected to the AC electric grid 310. The generator-side converter has a DC side and an AC side, and the AC side of the generator-side converter is electrically connected to the wind power generator 308. The DC side of the grid-side converter is electrically connected to the DC side of the generator-side converter through a DC bus. The above mentioned step S111 may further include the grid-side converter converting the AC power of the AC electric grid 310 into a second DC power, and then the generator-side converter converting the second DC power into the AC power of the wind power generator 308 through a DC bus.

By adopting the present invention, one terminal of the excitation control circuit is coupled between the converter and the wind power generator, and the other terminal is coupled to the excitation device. Thus the excitation power directly enters the excitation device from the wind power generator, without consuming the power by passing through the converter. As a result, the capacity load of the converter is reduced while the excitation efficiency of the system is improved. Furthermore, even when the voltage of the AC electric grid drops or a power failure of the AC electric grid occurs, the excitation control circuit can still output a DC voltage through the AC/DC conversion module, so as to provide the DC voltage to the excitation device of the wind power generator. Moreover, when the excitation control circuit has two circuit structures each formed by the converter and the AC/DC conversion module, the converters of the two circuit structures are complementary with each other, or alternatively, the AC/DC conversion modules of the two circuit structures are complementary with each other.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. An excitation control circuit for an electrically excited wind power system, comprising:
   at least one converter arranged between an AC electric grid and a wind power generator so as to convert AC power generated by the wind power generator into AC power corresponding to the AC electric grid; and
   at least one AC/DC conversion module having an input side and an output side, where the input side of the AC/DC conversion module is electrically connected between the converter and the wind power generator, the output side of the AC/DC conversion module is coupled to an excitation device, and the AC/DC conversion module is used to convert the AC power generated by the wind power generator into a DC voltage so as to provide the excitation current of the wind power generator through the DC voltage,
   wherein
   the AC/DC conversion module comprises a rectifier circuit and a DC/DC converter,
   the DC/DC converter is used to perform DC/DC conversion of the rectifier voltage outputted by the rectifier circuit, and
   a buffer unit comprising a buffer resistance and a switch connected in parallel is arranged between the rectifier circuit and the DC/DC converter.

2. The excitation control circuit of claim 1, wherein the converter comprises:
   a generator-side converter used to rectify the AC power generated by the wind power generator into a DC power; and
   a grid-side converter used to invert the DC power into the AC power corresponding to the AC electric grid, wherein the grid-side converter is electrically connected to the generator-side converter through a DC bus capacitor.

3. The excitation control circuit of claim 1, wherein the converter and the wind power generator are electrically connected to the rectifier circuit through a first filter unit, so as to filter the AC power generated by the wind power generator.

4. The excitation control circuit of claim 1, wherein the rectifier circuit is electrically connected to the DC/DC converter through a filter unit, so as to filter the rectifier voltage.

5. The excitation control circuit of claim 1, further comprising a DC/DC conversion module, so as to boost or buck the DC voltage outputted by the AC/DC conversion module and thus obtain an excitation voltage corresponding to the excitation current.

6. The excitation control circuit of claim 1, wherein a first common-mode rejection unit is further arranged between the converter and the AC electric grid, so as to reject a common-mode current.

7. The excitation control circuit of claim 1, wherein a common-mode rejection unit is further arranged between the converter and the wind power generator, so as to reject a common-mode current.

8. The excitation control circuit of claim 1, wherein a dv/dt rejection unit is further arranged between the converter and the wind power generator, so as to reject a dv/dt voltage.

9. A method for electrical excitation performed by an excitation control circuit for an electrically excited wind power system, wherein the excitation control circuit comprises at least one converter arranged between an AC electric grid and a wind power generator so as to convert AC power generated by the wind power generator into AC power corresponding to the AC electric grid, at least one AC/DC conversion module having an input side and an output side, where the input side of the AC/DC conversion module is electrically connected between the converter and the wind power generator, the output side of the AC/DC conversion module is coupled to an excitation device, the AC/DC conversion module is used to convert the AC power generated by the wind power generator into a DC voltage so as to provide the excitation current of the wind power generator through the DC voltage, a rectifier circuit, a DC/DC converter used to perform DC/DC conversion of the rectifier voltage outputted by the rectifier circuit, and a buffer unit arranged between the rectifier circuit and the DC/DC converter, the buffer unit comprising a buffer resistance and a switch connected in parallel, and the method for electrical excitation comprises:

activating the wind power generator using the AC power from the AC electric grid; and after the wind power generator is activated, switching the operation mode of the converter into a controlled mode.

10. The method of claim 9, wherein the step of activating the wind power generator comprises:

i) the converter converting the AC power of the AC electric grid into the AC power of the wind power generator according to predetermined voltage information;

ii) the AC/DC conversion module converting the AC power of the wind power generator into a first DC power, so as to provide the excitation current of the wind power generator through the first DC power; and iii) the excitation device starting to operate, so that the wind power generator is activated to transfer power energy to the AC electric grid.

11. The method of claim 10, wherein the converter comprises a generator-side converter and a grid-side converter, and step i) comprises:

the grid-side converter converting the AC power of the AC electric grid into a second DC power; and the generator-side converter converting the second DC power into the AC power of the wind power generator through a DC bus.

12. The method of claim 9, wherein the control mode is a torque control mode or a blade-speed control mode.

13. An electrically excited wind power system, comprising a wind power generator and an excitation device, wherein the excitation device is used for providing an excitation current of the wind power generator, and the electrically excited wind power system further comprises:

an excitation control circuit of claim 1.

14. An excitation control circuit for an electrically excited wind power system, comprising:

at least one converter arranged between an AC electric grid and a wind power generator so as to convert AC power generated by the wind power generator into AC power corresponding to the AC electric grid; and at least one AC/DC conversion module having an input side and an output side, where the input side of the AC/DC conversion module is electrically connected between the converter and the wind power generator, the output side of the AC/DC conversion module is coupled to an excitation device, and the AC/DC conversion module is used to convert the AC power generated by the wind power generator into a DC voltage so as to provide the excitation current of the wind power generator through the DC voltage;

wherein the at least one converter comprises a first converter and a second converter, and the at least one AC/DC conversion module comprises a first AC/DC conversion module and a second AC/DC conversion module, wherein the first converter is electrically connected to the first AC/DC conversion module, the second converter is electrically connected to the second AC/DC conversion module, and the first AC/DC conversion module and the second AC/DC conversion module are complementary with each other.

* * * * *